(12) United States Patent
Akin et al.

(10) Patent No.: US 7,831,511 B1
(45) Date of Patent: Nov. 9, 2010

(54) AUTOMATING SETUP OF A USER'S FINANCIAL MANAGEMENT APPLICATION ACCOUNT FOR ELECTRONIC TRANSFER OF DATA WITH A FINANCIAL INSTITUTION

(75) Inventors: Muhammet S. Akin, Santa Clara, CA (US); Anne-Marie Colendich, Aptos, CA (US); Gary S. Hanson, Mountain View, CA (US); Anders B. Martinson, Union City, CA (US); Edward D. Robinson, San Francisco, CA (US); Mark R. Shulman, Mountain View, CA (US); Jeannie M. Stauffer, Sunnyvale, CA (US); Lei Wang, Monte Sereno, CA (US)

(73) Assignee: Intuit Inc., Mountain View, CA (US)

( * ) Notice: Subject to any disclaimer, the term of this patent is extended or adjusted under 35 U.S.C. 154(b) by 1591 days.

(21) Appl. No.: 10/753,756

(22) Filed: Jan. 7, 2004

(51) Int. Cl.
G06F 17/60 (2006.01)
(52) U.S. Cl. ...................................................... 705/40
(58) Field of Classification Search ............... 705/1–60; 726/5; 235/375
See application file for complete search history.

(56) References Cited

U.S. PATENT DOCUMENTS

| 6,446,048 | B1 | 9/2002 | Wells et al. |
|---|---|---|---|
| 6,721,713 | B1 | 4/2004 | Guheen |
| 2001/0037295 | A1* | 11/2001 | Olsen ........................... 705/40 |
| 2002/0042764 | A1* | 4/2002 | Gardner et al. ................ 705/35 |
| 2003/0110111 | A1* | 6/2003 | Nalebuff et al. ............... 705/35 |
| 2004/0172340 | A1 | 9/2004 | Bishop |
| 2004/0193480 | A1 | 9/2004 | Pinsonnault et al. |
| 2004/0193880 | A1 | 9/2004 | Walmsley |
| 2004/0210450 | A1 | 10/2004 | Atencio et al. |

OTHER PUBLICATIONS

Durmus Özdemiry and Can Erbil, Does Financial Liberalization Trigger long-run Economic Growth?, May 1, 2008, web, 1-8.*

* cited by examiner

*Primary Examiner*—Mary Cheung
*Assistant Examiner*—Marissa Liu
(74) *Attorney, Agent, or Firm*—Osha • Liang LLP

(57) ABSTRACT

Computer implemented methods, systems, and computer program products for automating the setup of a user's financial management product account for electronic transfer of data between an account at a financial institution and the user's financial management product account, by receiving a link having financial account information, executing the user's financial management product in response to the link, extracting the financial account information from the link, providing the financial account information from the link to the user's financial management product, and configuring the financial management product account to receive electronic transfer of data from the account at the financial institution.

16 Claims, 5 Drawing Sheets

AUTOMATING SETUP OF A USER'S FINANCIAL MANAGEMENT APPLICATION ACCOUNT FOR ELECTRONIC TRANSFER OF DATA WITH A FINANCIAL INSTITUTION

BACKGROUND OF THE INVENTION

1. Field of the Invention

The present invention relates generally to automating the setup of a user's financial management application account for electronic transfer of data between an account at a financial institution and the user's financial management application account.

2. Description of Background Art

Financial management applications, such as Intuit Inc.'s Quicken® product and other similar products, provide users with comprehensive tools for organizing, tracking and manipulating the user's financial information. Typically, financial applications require entry by the user of significant amounts of information for financial transactions, such as date, amount of transaction, account number, payee and the like. In order to make these applications less burdensome and easier to use, certain financial management applications include the ability to create an account in the financial management application and to transfer data electronically between such account and an account of the user at a financial institution, for example, by downloading transactional data from the financial institution account into the application account.

Conventionally, before a user of a financial management software application can transfer data electronically between his or her account at a financial institution and the financial management application account, a number of "setup" steps had to be performed manually, such as:

(a) creating or retrieving an account in the financial management application to receive the data to be transferred from an account at the financial institution;

(b) identifying the financial institution with which the user desires to perform the electronic data transfers, along with the URL or other network addressing information in order to establish a network communication with such financial institution;

(c) navigating the financial management application menus to find the appropriate place(s) to enter the URL or other network addressing information;

(d) obtaining from the financial institution an identification number associated with the account at the financial institution from which and/or to which data will be transferred, such as the customer ID, PIN, ABA routing number, account number and the like;

(e) navigating the financial management application menus to find the appropriate place(s) to enter such identification number;

(f) entering such identification number at such appropriate place(s) so that the financial management application can establish communication with the account at the financial institution; and (g) where the financial institution has more than one account for the user corresponding to the account identification number, selecting one or more of the accounts presented for download of data.

After performing such "setup" steps, the accounts are ready for activation of the electronic data transfer. However, performing such setup steps before being able to transfer data electronically between the account in the financial management application and the account at the financial institution is time consuming, difficult and cumbersome. Users often did not understand the need to create or retrieve an account on the financial management application side in order to receive data transferred from the account at the financial institution. Even if a user managed to create an account on the financial management application side to receive the electronically transferred data from the account on the financial institution side, it was difficult for the user to initiate transfer of data. Further, after a user enrolled for online access at the financial institution through such financial institution's website, there was often no smooth transition back to the financial management application to complete the setup process. As a result, many users of financial management applications did not take advantage of the electronic transfer capabilities of such applications.

SUMMARY OF THE INVENTION

The present invention enables automatically setting up a user's financial management application account for electronic transfers of data between one or more accounts at a financial institution and the user's financial management application account. The present invention permits a smooth transition from online enrollment at a financial institution to activation of electronic data transfer from such account to an account created within the user's financial management application, thereby allowing easy access to and electronic transfer of data and other information between the financial management application and the financial institution.

At some time after completion of an online enrollment process for an account at a financial institution, the user is presented with a hypertext item. This hypertext item is linked to the user's financial management application. Upon selection of the hyperlink, the financial management application is automatically executed. The financial management application guides the user through the setup steps required to setup a financial management application account that is to receive data transferred electronically from an account at the financial institution. The hypertext link contains identification information about the financial institution and the user's identification number for his or her account at the financial institution, which is passed to the financial management application upon activation. This passed information is used by the financial management application to complete the setup process automatically, so that the user does not have to re-enter this information manually.

The hypertext link may be presented to the user in a variety of ways. Preferably, the hypertext link is presented after the enrollment process within the context of the financial institution's website, such as on a page where the user has options for accessing his or her account online or performing administrative tasks. Alternatively, the hypertext link can be embedded in an electronic mail that is sent to the user by the financial institution, for example, at the end of an account enrollment process, and is retrievable by the user while in the financial management application.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In the following description, specific details are set forth in order to provide a thorough understanding of the present invention. However, it will be apparent to one skilled in the art that the present invention may be practiced without these specific details, and well-known circuits, structures and techniques have not been shown in detail in order to avoid obscuring the present invention.

Figure 1:
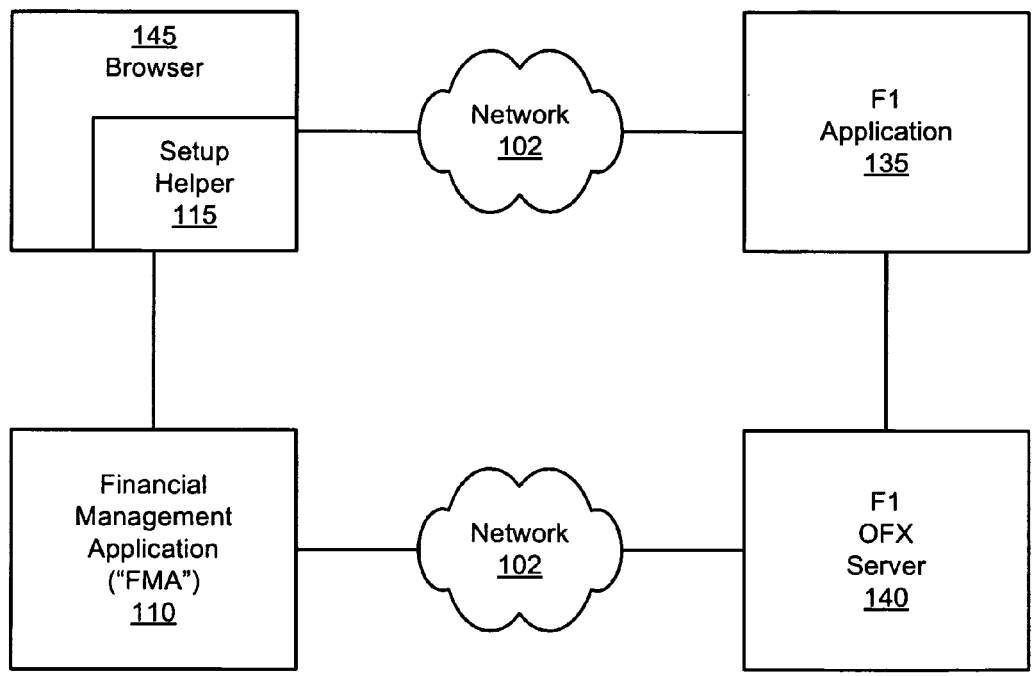
FIG. 1 is a block diagram illustrating the layout of the various components in one embodiment of the invention for automatically setting up a user's financial management application account for electronic transfer of data with an account at a financial institution.

FIG. 1 illustrates the layout of the various components in one embodiment of the system 100 for automatically setting up a user's financial management application account for electronic transfer of data with an account at a financial institution. As shown in FIG. 1, the financial management application 110 is coupled to a browser 145. In one embodiment the browser 145 contains a setup helper 115 in its web content. The browser 145 and the setup helper 115 are coupled via a network 102, such as a LAN, WAN or the Internet, to the financial institution ("FI") application 135. The FI application 135 is responsible for permitting access to and processing and handling all requests for data for accounts at the financial institution, and the functionality of the setup helper 115 is to aid with the automatic setup and will be described further below. The FI application 135 is further coupled to the FI OFX server 140. The FI OFX server 140 is a module that provides a secure channel for transfer of financial and other confidential data over the Internet. Any other server that provides a secure channel for transfer of confidential information may be used. The FI OFX server 140 is electronically coupled via network 102 to the financial management application 110. The embodiment of FIG. 1 illustrates that the financial management application 110 executes on a client computer of the user, along with the user's browser 145; alternatively, the financial management application 110 can execute on a website operated by an application service provider, in which case it would store the accounts for many unrelated users who access the application 110 from their browsers 145.

Figure 2:
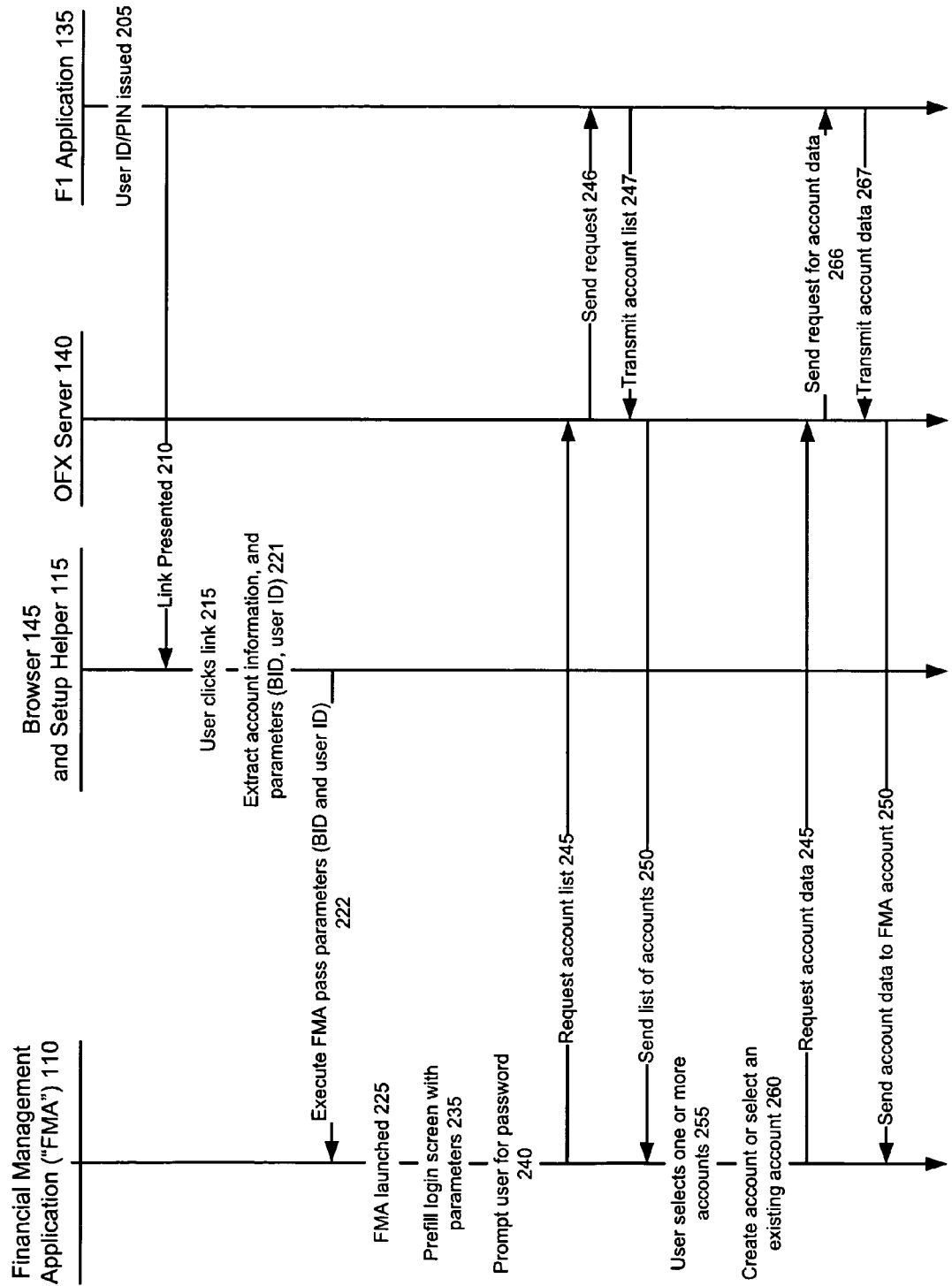
FIG. 2 is a sequence diagram illustrating, in a preferred embodiment, the steps for performing automatic setup of a user's financial management application account for electronic transfer of data between an account at a financial institution and the financial management application account.
Figure 3:
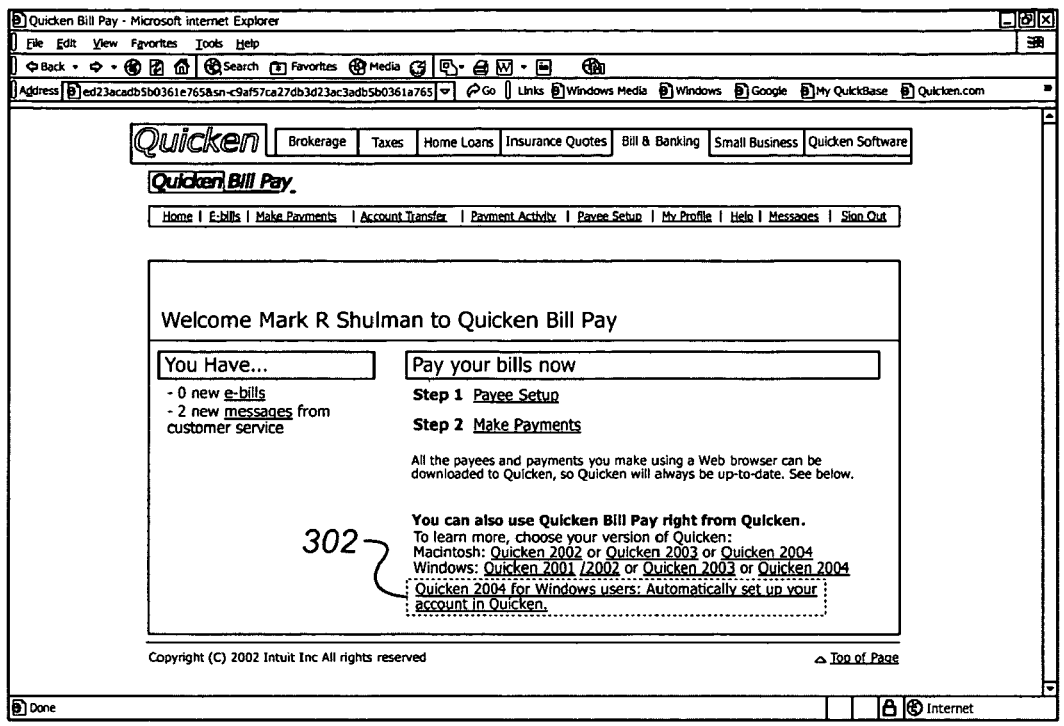
FIG. 3 is a sample screen shot in one embodiment of the invention illustrating the link presented in the browser of the financial management application for automating the setup of a user's financial management application account for electronic data transfers with one or more accounts at the financial institution.
Figure 4:
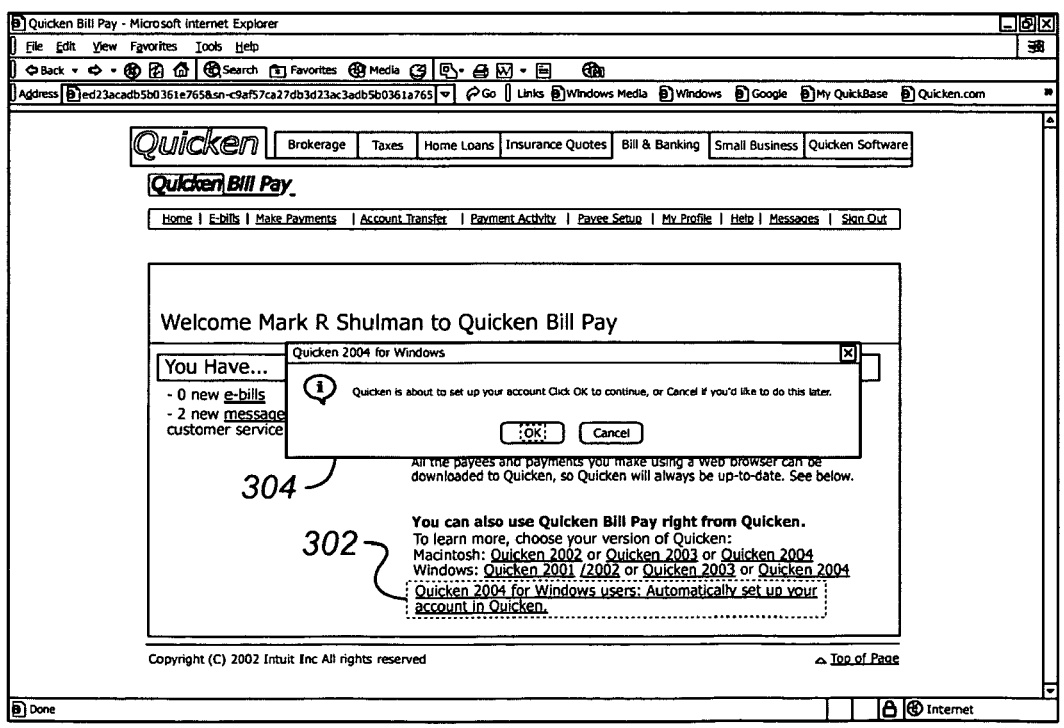
FIG. 4 is a sample screen shot in one embodiment of the invention prompting the user to approve the setup of the user's financial management application account.

FIG. 2 is a sequence diagram illustrating, in a preferred embodiment, the steps for performing automatic setup of a user's financial management application account for electronic transfer of data with an account at a financial institution. Prior to the steps in FIG. 2, the user, via the browser 145 engages in an online account enrollment or registration process by accessing the financial institution's website. At some time after completion of this online enrollment process for an account at a financial institution, in the preferred embodiment, the FI application 135 issues 205 to the user a user identification ("ID") number and a PIN number. In one embodiment, the FI application 135 then presents 210 a hypertext link to the browser 145 of the financial management application 110. The hypertext link is a link to the user's financial management application 110 and preferably contains information about the financial institution (e.g., an identifying number—otherwise known as a "BID number"—for the financial institution) and information about the user's account (e.g., the user ID number). More generally, however, the hypertext link may contain any information that can be used for accessing the account at the financial institution. For example, a portion of a sample link comprises the text "qw: add account? BID=1001+USER ID=123456". In this sample link, "qw" stands for Quicken® (which is an example of a financial management application 110), "1001" is the identifying (or BID) number for the financial institution from which the link was sent, and "123456" is the user ID number issued by the financial institution to the user. The hypertext link may be presented to the user in a variety of ways. In the embodiment illustrated in FIG. 1 and described in FIG. 2, the link is presented in the browser 145 of the financial management application 110 via network 102. FIG. 3 is a sample screen shot illustrating the link 302 presented in the browser 145, and FIG. 4 is a sample screen shot prompting the user for confirmation of setup of the user's financial management application account. In a preferred embodiment, upon confirmation of setup by the user, the financial management application 110 continues with the automatic setup of the user's financial management application account for electronic data transfer.

Note that the presentation of this link obviates the user's need to launch the financial management application, create an account within the financial management application, identify the financial institution with which the user desires to perform the electronic data transfers and find the URL or other network addressing information in order to establish a network communication with such financial institution. Moreover, it obviates the user's need to navigate the financial management application menus to find the appropriate place (s) to enter such URL or other network addressing information.

Alternatively, the hypertext link can be presented within the context of the financial institution's website, such as on a page where the user has options for accessing his or her account online, and performing administrative tasks. In another alternative embodiment, the hypertext link can be embedded in an electronic mail that is sent to the user by the financial institution, for example, at the end of an account enrollment process.

Returning to FIG. 2, the user, through the browser 145, then clicks 215 on the link. This causes the setup helper 115 to extract 221 the financial management application information from the link (e.g., "qw") and the financial institution BID information and the user ID number, and to send 222 a message to the financial management application 110 to execute the application 110, along with passing the BID and UID information to the financial management application 110.

Figure 5:
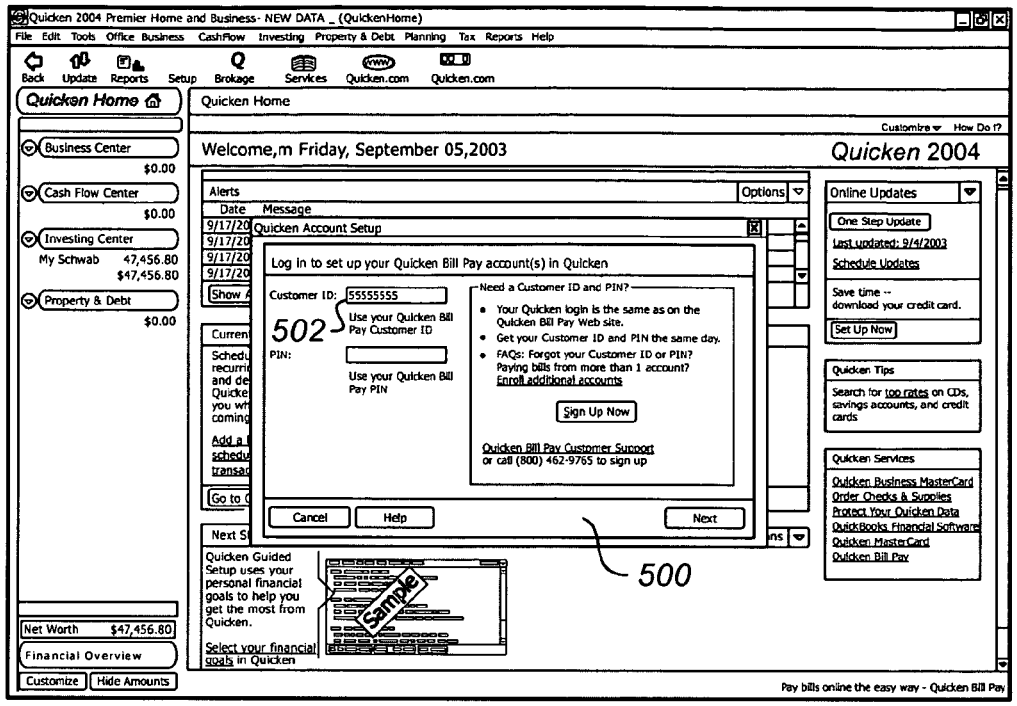
FIG. 5 is a sample screen shot in one embodiment of the invention illustrating a launched financial management application and a dialog box with the appropriate financial institution already selected and pre-filled with the user's identification number.

Next, based upon information sent by the setup helper 115, the financial management application 110 executes 225, pre-fills 235 the login screen with the information extracted from the link (such as BID information and the user ID number) and prompts 240 the user to enter a password. For security reasons, the password information is preferably not provided in the link and should preferably be input by the user. FIG. 5 is a sample screen shot illustrating a launched financial management application and a dialog box 500 with the appropriate financial institution already selected and pre-filled with the user's identification number 502 for the financial institution. Note that the user of the present invention is able to skip most of the steps described in the prior art system including (i) creating or retrieving an account in the financial management application to receive data electronically transferred from an account at the financial institution, (ii) navigating the financial management application menus to find the appropriate place(s) to select the financial institution and enter the identification number, and (iii) entering such identification number at such appropriate place(s) so that the financial management application can establish communication with the account at the selected financial institution.

Figure 6:
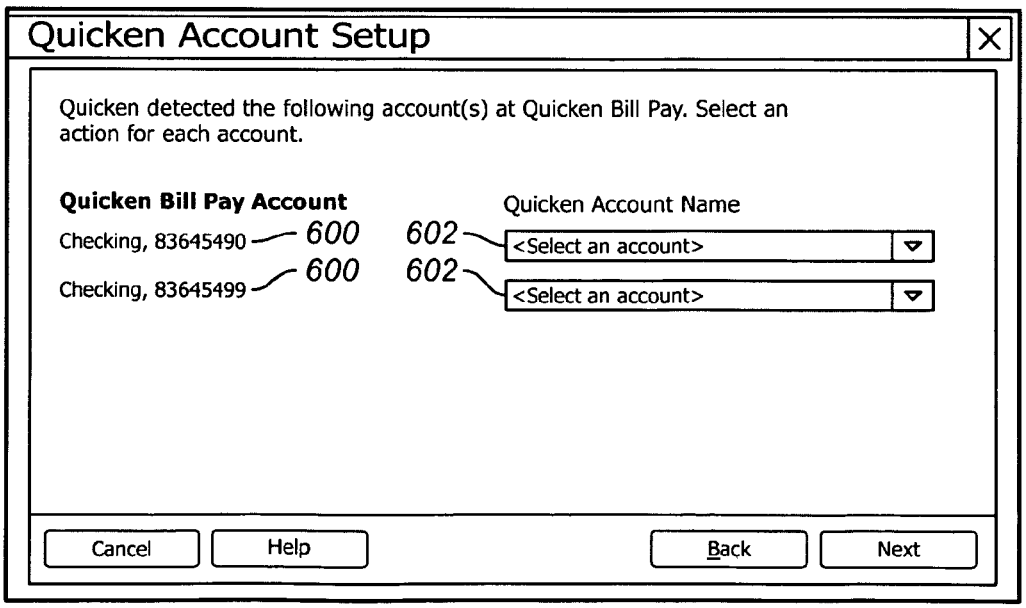
FIG. 6 is a sample screen shot in one embodiment of the invention illustrating the accounts associated with the user's identification number and retrieved from the financial institution, and prompting the user to select one or more of the financial management accounts for electronic transfer of data.

The financial management application 110 then requests 245 from the OFX server 140 the accounts associated with the user ID number at the financial institution having the BID number extracted from the link. The OFX server 140 sends 246 the request to the FI application 135. The FI application 135 transmits 247 the account list to the OFX server 140, and the OFX server 140 sends 250 a list of accounts associated with the user ID number. The user selects 255 one or more of the accounts for electronic transfer of data. FIG. 6 is a sample screen shot illustrating the accounts 600 associated with the user's identification number and retrieved from the financial institution, and prompting the user to select 602 or create one or more of the financial management accounts for electronic transfer of data.

Figure 7:
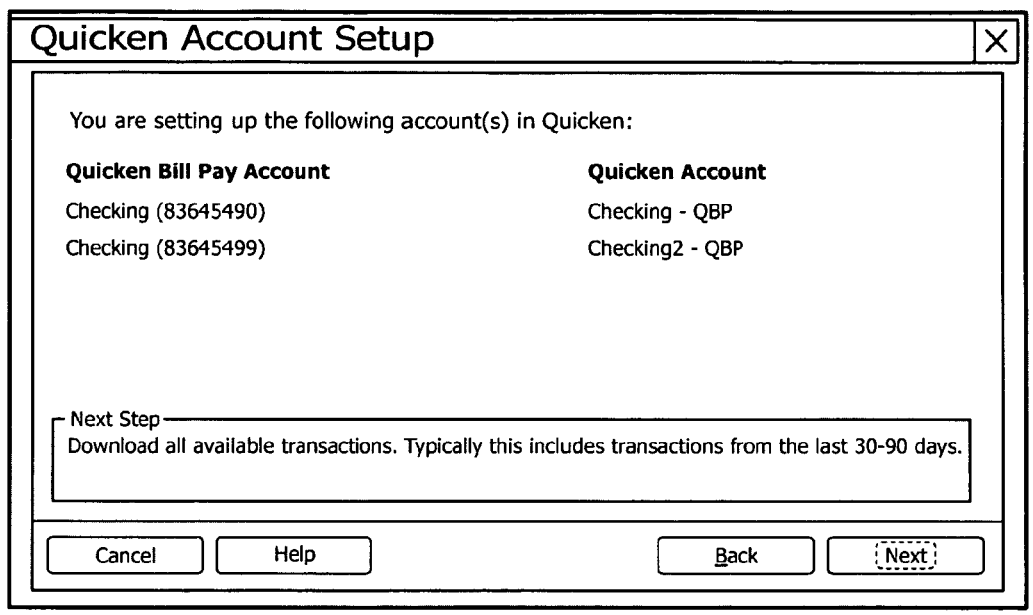
FIG. 7 is a sample screen shot in one embodiment of the invention prompting the user to initiate transfer of data from the selected account(s) at the financial institution with the financial management application account.

The financial management application 110, based upon input from the user, configures 260 the financial management account to receive the data to be transferred electronically from an account at the financial institution, including creating a new account in the financial management application corresponding to the selected financial institution account, or selecting an existing account, as appropriate. Finally, the financial management application 110 requests 265 the OFX server 140 to send data regarding the selected account(s) in the financial institution to the financial management application account. The OFX server 140 sends 266 the request for account data to the financial institution application 135. The financial institution application 135 then transmits 267 the account data to the OFX server 140, and the OFX server sends 270 account data to the account in the financial management application 110. Examples of account data include, but are not limited to the following: date, amount of a transaction, payee and account number, for any number of transactions. FIG. 7 is a sample screen shot in one embodiment of the invention prompting the user to initiate transfer of data (e.g., transactions from the last 30-90 days) from between the user selected account(s) at the financial institution and the financial management application account.

As noted above, the hypertext link in the present invention may be presented to the user in a variety of ways. As described in the embodiment illustrated in FIG. 1 and described in FIG. 2, the link is presented in the browser 145. Alternatively, the hypertext link can be embedded in an electronic mail that is sent to the user's email address by the financial institution, for example, at the end of the account enrollment process. In this alternative embodiment of the invention using electronic mail, in addition to all the components illustrated in FIG. 1, the system 100 also has an email server to support the financial management application 110. At the end of an online account enrollment process for an account at the financial institution, the financial institution application 135, through its email server, sends an email containing the hypertext link to an email server hosting the user's email account. The user then retrieves the email and is presented with the hypertext link in the body of the email message. The user may click on the link to commence the automatic setup of the user's financial management application account for electronic transfer of data with the financial institution. The link in this alternative embodiment preferably has all the traits as the link described in the embodiment discussed with respect to FIGS. 1 and 2 above, and except for the conveyance of the link via email, all the steps for performing the automatic setup are preferably the same.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the feature of the present invention in terms of algorithms and symbolic representations of operations on information. These algorithmic descriptions and representations are the means used by those skilled in the data processing arts to most effectively convey the substance of their work to others skilled in the art.

These operations, while described functionally or logically, are understood to be implemented by computer programs. It should be noted that the process steps and instructions of the present invention could be embodied in software, firmware or hardware, and when embodied in software, could be downloaded to reside on and be operated from different platforms used by real time network operating systems. Furthermore, it has also proven convenient at times, to refer to these arrangements of operations as modules or other functional names, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "linking," "executing," "launching," "processing," or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The operations and structures presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer implemented method for automating a setup of a user's financial management product account for an electronic transfer of financial transaction data between a user's account at a financial institution and the user's financial management product account, comprising:
   electronically executing a financial management product on a processor in response to selection of a link presented by the financial institution, wherein the link comprises an account number of the user's account at the financial institution, an identifier of the financial institution, and an identifier of the financial management product, wherein execution of the financial management product is triggered by the selection of the link;
   electronically extracting, by the financial management product, the account number and the identifier of the financial institution from the link; and
   electronically configuring the user's financial management product account to receive the electronic transfer of financial transaction data from the user's account at the financial institution using the account number and the identifier of the financial institution extracted from the link.

2. The method of claim 1, further comprising:
   receiving the link in an email sent from the financial institution to a user of the financial management product.

3. The method of claim 1, further comprising:
   receiving the link in a browser viewed by a user of the financial management product.

4. The method of claim 1, wherein the link further comprises user identification information.

5. The method of claim 1, further comprising:
   requesting, from the financial institution, the financial transaction data for the user's financial management product account; and
   receiving and storing in the user's financial management product account, the financial transaction data for transactions occurring in the user's account at the financial institution.

6. The method of claim 1, wherein the financial management product executes on a client computer of the user.

7. The method of claim 1, wherein the financial management product executes on a web site of a service provider, and maintains financial product accounts for a plurality of unrelated users.

8. A computer program product for automating a setup of a user's financial management product account for an electronic transfer of financial transaction data between a user's account at a financial institution and the user's financial management product account, the computer program product comprising computer executable instructions for causing a processor to:
   execute a financial management product on the processor in response to selection of a link presented by the financial institution, wherein the link comprises an account number of the user's account at the financial institution, an identifier of the financial institution, and an identifier of the financial management product, wherein execution of the financial management product is triggered by the selection of the link;
   extract the account number and the identifier of the financial institution from the link; and
   configure the user's financial management product account to receive the electronic transfer of financial transaction data from the user's account at the financial institution using the account number and the identifier of the financial institution extracted from the link.

9. The computer program product of claim 8, wherein the computer executable instructions further cause the processor to:
   receiving the link in an email sent from the financial institution to a user of the financial management product.

10. The computer program product of claim 8, wherein the computer executable instructions further cause the processor to:
    receiving the link in a browser viewed by a user of the financial management product.

11. The computer program product of claim 8, wherein the link further comprises user identification information.

12. The computer program product of claim 8, wherein the computer executable instructions further cause the processor to:
    requesting, from the financial institution, the financial transaction data for the user's financial management product account; and receiving and storing in the user's financial management product account, the financial transaction data for transactions occurring in the user's account at the financial institution.

13. The computer program product of claim 8, wherein the financial management product executes on a client computer of the user.

14. The computer program product of claim 8, wherein the financial management product executes on a web site of a service provider, and maintains financial product accounts for a plurality of unrelated users.

15. A system for automating setup of a user's financial management product account for electronic transfer of financial transaction data between a user's account at a financial institution and the user's financial management product account, the system comprising:

means for executing a financial management product in response to selection of a link presented by the financial institution, wherein the link comprises an account number of the user's account at the financial institution, an identifier of the financial institution, and an identifier of the financial management product, wherein executing the financial management product is triggered by the selection of the link;

means for extracting the account number and the identifier of the financial institution from the link; and means for configuring the user's financial management product account to receive the electronic transfer of financial transaction data from the user's account at the financial institution using the account number and the identifier of the financial institution extracted from the link.

16. A computer program product for automating setup of a user's financial management product account for electronic transfer of financial transaction data between a user's account at a financial institution and the user's financial management product account, the computer program product comprising computer executable instructions for causing at least one processor to execute:

means for executing a financial management product in response to a selection of a link presented by the financial institution, wherein the link comprises an account number of the user's account at the financial institution, an identifier of the financial institution, and an identifier of the financial management product wherein executing the financial management product is triggered by the selection of the link;

means for extracting, by the financial management product, the account number and the identifier of the financial institution from the link; and means for configuring the user's financial management product account to receive the electronic transfer of financial transaction data from the user's account at the financial institution using the account number and the identifier of the financial institution extracted from the link.

\* \* \* \* \*